United States Patent

[11] 3,572,678

[72] Inventor Joseph Jerz, Jr.
 131 Wylerhorn St., Crestline, Calif. 92325
[21] Appl. No. 768,345
[22] Filed Oct. 17, 1968
[45] Patented Mar. 30, 1971

[54] OVERLOAD SPRING STRUCTURE
 12 Claims, 4 Drawing Figs.
[52] U.S. Cl. ................................................. 267/60
[51] Int. Cl. ..................................................... B60g 11/02
[50] Field of Search ........................................ 267/60, 34, 8, 120

[56] References Cited
UNITED STATES PATENTS
2,782,051 2/1957 Smith ........................... 267/60
3,263,983 8/1966 Bliven ........................... 267/120

Primary Examiner—James B. Marbert
Attorney—William P. Green

ABSTRACT: An overload spring assembly for a vehicle, including two coil springs or spring sections interposed between the sprung and unsprung masses of the vehicle, with one of the two springs being stiffer than the other, and with the springs being ineffective to assist the main suspension system under normal load conditions, but being movable into supporting relation under a predetermined overload condition. Stops associated with the springs, and preferably carried by a shock absorber within the interior of the springs, cause the springs when they do become effective to produce first a soft supporting action, and then a stiffer action dependent only upon the characteristics of the stiffer spring, with the stops preferably also serving in an extended or rebound condition to resiliently limit the separation of the sprung and unsprung masses.

Patented March 30, 1971 3,572,678
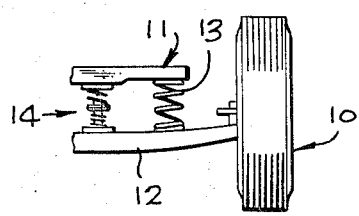
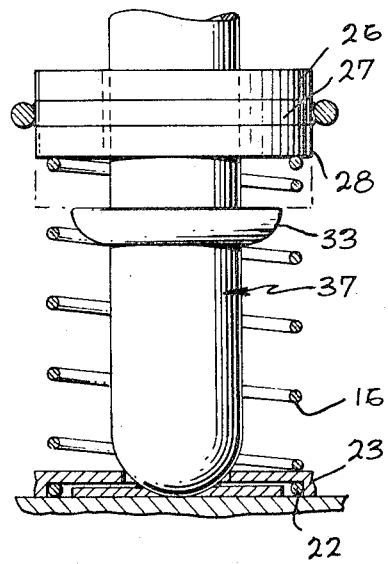
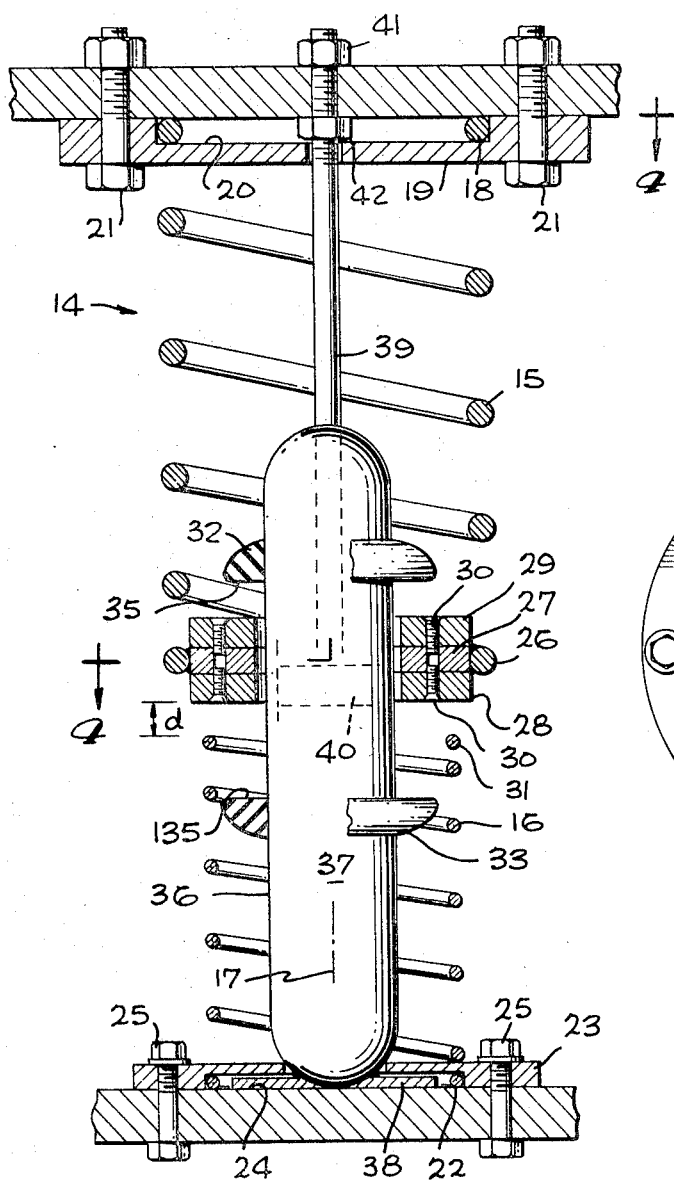
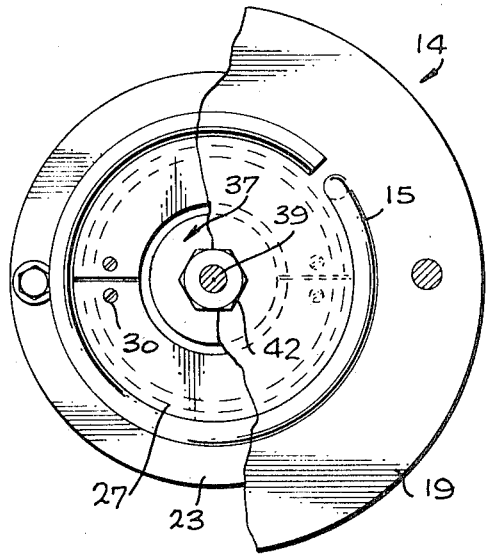
INVENTOR.
JOSEPH JERZ, JR.
BY William P. Green
ATTORNEY 3,572,678

OVERLOAD SPRING STRUCTURE

CROSS REFERENCE TO RELATED APPLICATION

Certain features of the apparatus disclosed in the present application are shown in my copending application entitled "Variable Stiffness Suspension System," Ser. No. 768,249, filed of even date herewith.

BACKGROUND OF THE INVENTION

This invention relates to improved overload or 'helper' springs for automobiles and other vehicles.

Most conventional types of overload springs, though capable of serving fairly well their primary purpose of increasing the load which can be supported in the vehicle, have had the common disadvantage of inherently and unavoidably rendering the riding qualities of the vehicle very unsatisfactory. More specifically, these prior overload assemblies have usually produced a very stiff ride, that is, one in which rough and abrupt movements caused by irregularities in the road are transmitted to the body of the vehicle with very little cushioning effect. These rough riding qualities have been encountered so long as the overload spring assembly is mounted on the vehicle in a condition to support overloads, and even though the load actually in the vehicle at a particular time is very light.

SUMMARY OF THE INVENTION

In an overload spring arrangement constructed in accordance with the present invention, the smoothness and quality of the ride may be completely unaffected by the overload spring assembly under normal or light load conditions, so that under such conditions the same riding qualities are attained as would be produced by the main suspension system of the vehicle if the overload assembly were not present. When an overload condition occurs, however, the overload spring assembly automatically comes into effect to assist in supporting the weight of the sprung mass. Further, the assembly is designed to, at that time, first produce a relatively soft or weak supporting effect for supplementing the main suspension system rather lightly, and then upon further downward movement of the sprung mass produce a stiffer assisting effect.

Structurally, the assembly includes tow springs or spring sections, one of which is stiffer than the other, with the springs being so constructed and positioned that under normal load conditions they are ineffective to assist in supporting the sprung mass, whereas upon an increase in load applied to the vehicle, the lighter or weaker spring first compresses, followed by compression of the stiffer spring to attain maximum support. Conversion between the light spring and stiff spring supporting condition is attained by provision of stop shoulders which limit compression of the weaker or softer spring. Additionally, upon excessive upward bounce or rebound of the sprung mass, other stop shoulders become effective to actually support the unsprung mass from the sprung mass through the stiffer of the two springs. Certain of the stop shoulders may be carried by a shock absorber located within the spring assembly, and connected to the sprung and unsprung masses in a manner resisting relative movement thereof.

BRIEF DESCRIPTION OF THE DRAWING

The above and other features and objects of the invention will be better understood from the following detailed description of the typical embodiment illustrated in the accompanying drawing, in which:

FIG. 1 is a fragmentary diagrammatic representation of a portion of a motor vehicle having an overload spring assembly constructed in accordance with the invention;

FIG. 2 is a greatly enlarged fragmentary view showing the overload spring assembly of FIG. 1;

FIG. 3 shows fragmentarily the assembly of FIG. 2 under a slight overload condition; and FIG. 4 is a horizontal section taken on line 4—4 of FIG. 2.

DESCRIPTION OF THE PREFERRED EMBODIMENT

Referring first to FIG. 1, I have illustrated in that FIG., one of the four wheels 10 of an automobile or other motor vehicle, having a conventional suspension system of any known type for resiliently supporting a body or sprung mass 11 from a wheel-carrying or wheel-connected unsprung mass 12. The conventional suspension system may for example include four coil springs 13 located near the four wheels respectively of the vehicle, for resiliently supporting the sprung mass 11 at its corners. This suspension system, under normal load conditions, supports the sprung mass in the normal position illustrated in FIGS. 1 and 2, with the sprung mass being movable downwardly toward and relative to unsprung mass 12 and wheels 10 upon the imposition of an overload to the vehicle.

In association with the two rear wheels respectively of the vehicle, there are provided two overload coil spring assemblies 14, for assisting the main suspension springs 13 in supporting the sprung mass under overload conditions. If desired, and if permitted by the structure of the front wheels and their suspension, two additional overload coil spring assemblies, of the same type shown at 14 in FIGS. 1 and 2, may be provided in association with the front wheels.

As seen best in FIG. 2, each of the overload spring assemblies includes an upper coil spring 15 which is relatively stiff and strong and has a relatively high spring rate (pounds per inch of compression) and a second and softer spring 16, having a lower spring or ride rate. Both of these springs 15 and 16 may be centered about a common vertical axis 17, with the lower spring preferably being of smaller diameter than the upper spring about axis 17, and normally also being formed of a smaller size wire.

The upper end of upper stiff spring 15 has a top turn 18 which, instead of advancing helically as do the other turns of the spring, extends annularly about axis 17, and transversely of that axis. Spring 15 is secured to the vertically movable sprung mass 11 of the vehicle by a clamping element 19, which is received at the underside of the illustrated portion of the sprung mass, and which contains an annular recess 20 for receiving turn 18 of spring 15 and clamping it upwardly against the horizontal undersurface of sprung element 11, in fixed position relative thereto. Screws 21 secure the clamping element 19 to the sprung mass, as illustrated.

Similarly, the lower end turn 22 of bottom soft spring 16 is shaped to extend annularly rather than helically about axis 17, and therefore transversely of that axis, and is secured in fixed position relative to the unsprung mass 12 by a clamping element 23, containing an annular recess 24 for receiving the turn 22 of spring 16, with screws 25 securing parts 23 and 12 together. As will be apparent, clamping elements 19 and 23 of course contain openings through which the associated springs extend as they advance axially from within the recesses 20 and 24 to the underside of clamping element 19 and the upper side of clamping element 23.

At its lower end, the stiff spring 15 has another transverse annular turn 26, which rigidly carries an annular stop shoulder or stop element 27, typically formed of an appropriate metal annularly welded or otherwise secured to the turn 26. This stop shoulder or flange 27 may in effect be increased in axial thickness by provision of two annular shims 28 and 29, which are detachably secured to the underside and the upper side respectively of element 27 by screws 30 or other fastening means, and each of which may be formed of two separate semicircular segments (FIG. 4) to facilitate their removal when desired.

The upper end turn 31 of the soft spring 16 is disposed transversely of axis 17, and annularly thereabout, and is of a diameter corresponding to a radially outer portion of shoulder element 27 and its shims 28 and 29, to be engageable with the horizontal undersurface of element 27 when shim 28 is detached therefrom. The springs and other parts are so designed that, when the sprung mass or body 11 of the vehicle is loaded normally, that is, with no excess weight in or on the vehicle, upper turn 31 of spring 16 is spaced vertically from the undersurface of stop element 27, or from the undersurface of shim 28 if the shim is in use. This vertical spacing is illustrated at $d$ in FIG. 2.

For further coaction with the stop shoulder or element 27 or its shims 28 and 29, there are provided two annular upper and lower stop elements or shoulders 32 and 33, the first of which has an annular undersurface 35 disposed transversely of axis 17 for engaging the upper surface of element 27 or its shim 29, and the second of which has an upper annular surface 135 disposed transversely of axis 17 for engaging the undersurface of element 27 or shim 28. These stop elements 32 and 33 are secured in fixed position relative to the unsprung mass 12, to limit the vertical movement of the element 27 carried at the lower end of spring 15. Preferably, stop elements 32 and 33 are carried by the cylinder 36 of a shock absorber 37, which is connected between the sprung and unsprung masses. More particularly, cylinder 36 of the shock absorber may be secured to the unsprung or wheel connected mass 12 by provision at the lower end of the cylinder of a horizontal laterally projecting annular flange 38, rigidly carried by the cylinder and confined within the recess 24 in the clamping element 23. The piston rod 39 of the shock absorber, which piston rod is of course connected to the usual piston 40 contained within cylinder 36, is connected at its upper end rigidly to the sprung mass 11, as by connection of two clamping nuts 41 and 42 onto a threaded upper portion of the piston rod.

To now describe the manner of operation of the auxiliary or overload springs of the present invention, assume first of all that the sprung mass 11 of the vehicle of FIG. 1 is carrying only a normal load, and that the conventional suspension springs 13 of FIG. 1 therefore support the sprung mass 11 in the FIG. 2 position relative to unsprung mass 12. In this condition, the upper turn 31 of the lower soft spring 16 of each overload spring assembly is spaced vertically from the underside of shim 28, so that the two springs 15 and 16 are completely out of force transmitting engagement with one another, and do not assist the main suspension system in supporting sprung mass 11. Thus, the riding characteristics of the vehicle are controlled entirely by the normal suspension system, and the ride is therefore very soft and not stiffened to any extent whatever by the presence of the overload or auxiliary spring assemblies 14 on the vehicle. The amount of spacing $d$ between the spring 16 and the shim 28 is such as to enable as much relative vertical movement of these parts as will usually occur under normal loading conditions, without bringing spring 16 into actual engagement with shim 28. If, now, an increased load is applied to the sprung mass or body 11 of the vehicle, this increased weight will overcome main suspension springs 13 sufficiently to move the sprung mass 11 downwardly and bring shim 28 into engagement with the upper turn of spring 16, as indicated in FIG. 3. In this condition, the two springs 15 and 16 are in effect connected in series between the sprung mass 11 and unsprung mass 12, to thus add their supporting force to that of main suspension springs 13. As the weight on the vehicle increases, the relatively soft spring 16 compresses fairly rapidly, with little or no compression of the upper stiff spring 15, so that the initial load supporting effect of the auxiliary spring system is a soft additive effect dependent upon the strength of soft spring 16. If the load increases to a value sufficient to force shim 28 downwardly into contact with stop shoulder 135 carried by the shock absorber, this engagement prevents further compression of the soft spring 16, and thereafter requires compression of the upper stiff spring 15 upon any greater downward movement of sprung mass 11 relative to unsprung mass 12. Thus, the support afforded by the overload spring assembly converts automatically from a soft resilient support to a stiffer support, to provide the relatively great force necessary to support the heavy load of the vehicle. Upon a subsequent decrease in load, the auxiliary spring system of course converts automatically in a reverse direction through the three different conditions which have been discussed, consisting of a stiff ride condition in which the full force of upper spring 15 supports the load, a softer ride condition in which lower spring 16 is the main effective element, and the FIG. 2 softest and normal condition in which neither of these springs is effective and the sole support is through the main suspension system 13.

If the wheels of the vehicle strike an irregularity in the road tending to cause an excessive rebound of sprung mass 11 upwardly relative to and away from unsprung mass 12, stop shoulder element 27 or its upper shim 29 engages upwardly against the undersurface of annular stop element 32 on the shock absorber, to transmit upward forces directly to the body of the shock absorber and unsprung mass 12 from the lower end of spring 15, so that further upward separation of mass 11 relative to mass 12 is resisted resiliently by the full force of stiff spring 15 (which is in that condition extended axially and resiliently to an increased length beyond that of its normal or undeformed condition of FIG. 2). In this way, the illustrated auxiliary spring assembly effectively limits and prevents excessive separation of the sprung and unsprung masses.

The shock absorber 37 is desirably of a double-acting type, in which its fluid within cylinder 36 resists both upward and downward movement of the piston 40, to thereby retard both upward and downward movements of the sprung mass 11 relative to mass 12, and thereby optimize the functioning of the overload spring assembly, and prevent too frequent or too rapid conversion of the system between its different suspending conditions. The positions at which the auxiliary spring system converts between its different conditions may be altered by removal or installation of one or both of the shims 28 or 29, or replacement of shims of different thicknesses, or by mounting stop shoulders 32 and 33 in suitable manner for vertical adjustment along shock absorber cylinder 36.

Shims 28 and 29 and stops 35 and 135 may all be formed of a suitable rigid material, such as steel or another metal, to produce an abrupt stopping action when either shim contacts one of the stops; or, alternatively and preferably, some or all of these elements 28, 29, 35 and 135 may be formed of an appropriate elastomeric material, such as a fairly hard rubber to cushion the stopping action and enable some resiliently resisted motion of element 27 after contact of it or one of the shims with element 35 or 135. In either instance, it is for best results desirable that the stop shoulders completely halt all compression of spring 16 at a position in which its successive turns are still spaced axially apart a substantial distance, and are not in direct abutting engagement with one another, so that except for the limiting action produced by engagement of shim 28 or element 27 with stop 135, the spring 16 would be free for further compression.

I claim:

1. In a motor vehicle having a main suspension system supporting a sprung mass resiliently in a predetermined normal position relative to an unsprung mass; overload apparatus comprising two coil spring sections in addition to said main suspension system received operatively and in series between said sprung and unsprung masses, a first of said spring sections being relatively stiff and the second section being relatively soft, said sections being ineffective to assist in supporting the sprung mass in said normal position thereof but being positioned and constructed to become effective for such support in series with one another when the sprung mass moves downwardly relative to the unsprung mass to an overload position, and shoulder means engageable upon predetermined further downward movement of said sprung mass relative to said unsprung mass beyond said overload position to thereafter support said sprung mass by said stiffer section independently of said softer section.

2. Overload apparatus as recited in claim 1, including shoulder means engageable in an elevated relative position of said sprung mass to yieldingly resist further relative elevation of said sprung mass by the force of said stiff spring section and independently of said soft spring section.

3. Overload apparatus as recited in claim 1, including a shock absorber within said two spring sections.

4. Overload apparatus as recited in claim 1, including a shock absorber within said two spring sections and connected at its opposite ends to said two masses respectively.

5. Overload apparatus as recited in claim 1, in which said spring sections are formed separately and have adjacent ends which in said normal position are out of load transmitting relation but are movable into load transmitting relation in said overload position of the sprung mass.

6. Overload apparatus as recited in claim 1, in which said spring sections are formed separately and have adjacent ends which in said normal position are spaced apart but are movable into load-supporting relation to transmit forces therebetween in said overload position, said shoulder means including a first stop shoulder carried by said end of one of said spring sections, and a second stop shoulder engageable by said first stop shoulder after predetermined compression of said soft spring section to prevent further compression thereof and transmit load forces between said masses directly through only said stiff spring section.

7. Overload apparatus as recited in claim 1 in which said two spring sections are formed separately and have first ends received in load-supporting relation with respect to said two masses respectively, said sections having second ends which in said normal position are spaced apart but are moveable into load-supporting relation to transmit forces therebetween in said overload position, there being a first stop shoulder carried by said second end of one of said spring sections, and a second stop shoulder engageable by said first stop shoulder after predetermined elevation of said sprung mass above said normal position to yieldingly resist further relative elevation of said sprung mass by the force of said stiff spring section.

8. Overload apparatus as recited in claim 1 in which said stiff spring section has a first end secured in fixed position to one of said masses, said shoulder means including a shoulder at the opposite end of said stiff spring section, and an additional shoulder carried by the other mass and engageable by said first shoulder in force transmitting relation after said predetermined relative movement of said two shoulders.

9. Overload apparatus as recited in claim 1 in which said stiff spring section has a first end connected in fixed position to one of said masses and has a second end which in said normal position is out of load transmitting relation with said soft spring section, but is relatively movable into such load-transmitting relation in said overload position, said shoulder means including a shoulder structure carried by said second end of said stiff section and engageable with two additional shoulders carried by the other mass to limit relative movement of said second end of the stiff section both upwardly and downwardly.

10. Overload apparatus as recited in claim 9 including a shock absorber extending vertically within said spring sections and connected at opposite ends to said two masses respectively, and means mounting said additional shoulders at spaced locations on said shock absorber.

11. Overload apparatus as recited in claim 1 including means securing a first end of said stiff spring section fixedly to one of said masses and a first end of said soft section fixedly to the other mass, said sections having second ends which in said normal position are out of load transmitting relation but are movable into such relation in said overload position, said shoulder means including a stop shoulder structure carried by said second end of said stiff spring section, there being a shock absorber within the sections and having a cylinder and piston connectable one to each of said masses, said shoulder means including two stop shoulders carried by said cylinder of the shock absorber at spaced locations and engageable with said first mentioned stop shoulder structure to transmit forces therefrom directly to the cylinder in two predetermined positions one of which is beneath the position in which said two spring sections move into load transmitting relation, and the other of which is above said normal position.

12. In a vehicle having a main suspension system supporting a sprung mass resiliently in a predetermined normal position relative to an upsprung mass; overload apparatus including a stiff coil spring section and a softer coil spring section received operatively in series between said sprung and unsprung masses, said spring sections being ineffective to assist in supporting the sprung mass in said normal position thereof but being positioned and constructed to become effective for such support in series when the sprung mass moves downwardly relative to the unsprung mass to an overload position, there being shoulder means engageable in an elevated relative position of said sprung mass above said normal position thereof to yieldingly resist further relative elevation of said sprung mass by the force of said stiff section independently of said softer section.